Sept. 13, 1966            S. AVAKIAN            3,272,719
METHOD AND APPARATUS FOR DETERMINING THE SENSITIVITY OF
BODY FLUID INFECTANTS TO DRUGS
Filed Aug. 6, 1964
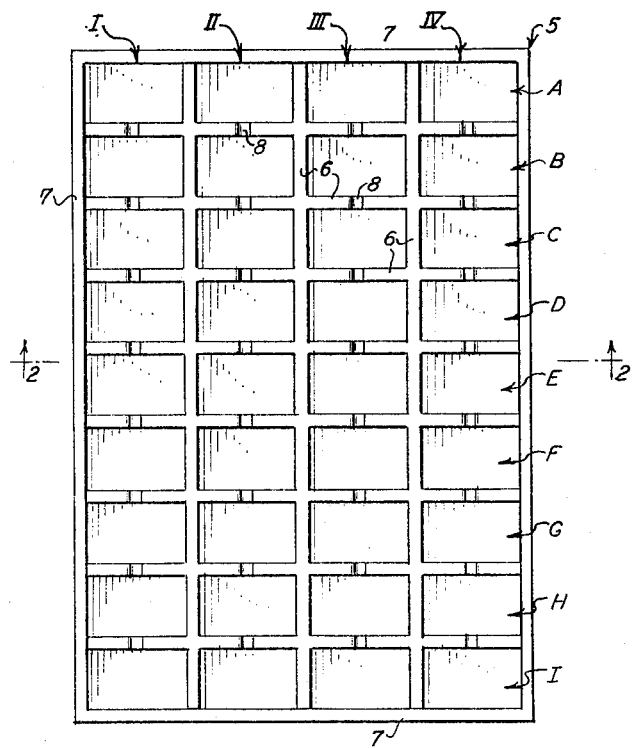
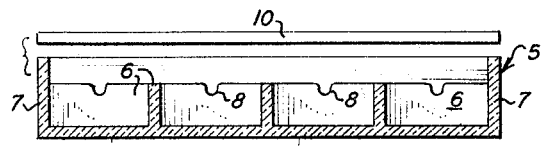
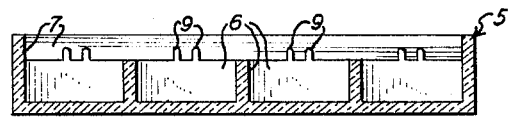
INVENTOR
SOUREN AVAKIAN
BY
ATTORNEYS

United States Patent Office 3,272,719
Patented Sept. 13, 1966

3,272,719
METHOD AND APPARATUS FOR DETERMINING THE SENSITIVITY OF BODY FLUID INFECTANTS TO DRUGS
Souren Avakian, Westport, Conn., assignor to The Denver Chemical Manufacturing Company, Stamford, Conn., a corporation of Colorado
Filed Aug. 6, 1964, Ser. No. 387,933
8 Claims. (Cl. 195—103.5)

This invention relates to a new and useful method and apparatus for determining the sensitivity of body fluids to drugs. More particularly, it relates to a method for testing the effect of various drugs in varied concentrations on the pathogens contained in infected urine or other body fluid.

The infected fluid is introduced into a series of adjacent isolated pools of sterile nutrient material, each containing a known concentration of a drug under test, by saturating a narrow elongated strip of bibulous material with the infected fluid, laying it across a plurality of said adjacent pools and allowing it to sag into each such pool. This invention also includes apparatus for carrying out the said test, the apparatus comprising a plate having on its upper surface a series of adjacent shallow pools separated by partitions, certain of the partitions being provided on their upper edges with means to receive said bibulous strip and prevent inadvertent lateral displacement thereof.

In the therapy of urinary tract infections it is important to know the character of the infecting organism and its sensitivity to the various agents available for combating the infection. This is particularly the case now in view of the growing number of suitable available drugs on the one hand and the development of resistant strains of pathogens on the other.

While in vitro test results do not assure clinical success, they give an indication of what may be expected in vivo and provide a guide for clinical test and treatment.

For many years physicians have relied upon sensitivity discs for in vitro information on bacterial resistance to various drugs. The procedure for use of these discs is complicated and subject to inherent errors. One of the major faults lies in the fact that the greatest drug content may be found in the area immediately adjacent to the disc. For this reason, interpretation of the zone of inhibition resulting from their use may be erroneous.

One object of the present invention is to provide a method for determining pathogen sensitivity to various drugs which is completely free of this possibility of error.

Another object of the invention is to provide such a method which is rapid and simple to carry out.

An additional object of the invention is the provision of simple and economical apparatus for use with my new method.

According to my invention, a plate is provided having on its surface adjacent shallow compartments, each adapted to hold a small pool of liquid. The compartments are conveniently of square shape and arranged in rows and files. The partition between each adjacent pair of compartments in the same file is provided with a shallow notch or recess adapted to receive a string, ribbon or paper strip laid along the top of the file and prevent its inadvertent lateral displacement. Instead of a notch or recess, two closely placed beads on each partition may serve the same purpose but they must not be so high as to prevent a cover glass laid on the compartmented plate from making contact with the peripheral walls enclosing the outer compartments.

Each compartment may contain a sterile nutrient medium, a known concentration of a drug under test and a sample of the infected urine or other fluid being studied, except that certain control compartments may contain only the nutrient medium and infected urine.

To introduce the infected material uniformly into the compartments, pieces of sterile string of suitable length are saturated with the infected fluid and each length laid along the top of a file in the above mentioned notches or other retaining means, allowing the string to sag into each compartment. Instead of string, narrow strip of absorbent paper (e.g., S. & S. #470 filter paper) or other bibulous material may be used. The string or strip may, of course, be omitted from entering certain control compartments.

Virtually any of the available antibacterial drugs may be employed. Examples of these are as follows:

(A) Antibiotics:
   (1) penicillins (synthetic, non-synthetic and semi-synthetic)
   (2) streptomycin
   (3) tetracycline
   (4) chlortetracycline
   (5) oxytetracycline
   (6) demethylchlortetracycline
   (7) neomycin
   (8) chloramphenicol
   (9) erythromycin
   (10) oleandomycin
   (11) polymixin B
   (12) colistin sulfate
   (13) kanamycin
   (14) novobiocin
(B) Sulfa drugs:
   (1) sulfathiazole
   (2) sulfaguanidine
   (3) sulfamethizole
   (4) sulfadimethoxine
   (5) sulfisoxazole
   (6) sulfamethoxazole
(C) Miscellaneous drugs:
   (1) methenamine mandelate
   (2) nitrofurantoin
   (3) furazolidone
   (4) nitrofurazone While the above examples are offered, this application is not limited to these drugs.

It is convenient to employ a rectangular plate with four files of nine rows of compartments, thus furnishing 36 pools, of which the first row may be reserved for controls.

For the better understanding of my invention it will be illustrated by the following example of a preferred method of operation and preferred apparatus, but this example is intended to be illustrative only and not to limit my invention, the scope of which is defined in the appended claims.

*Example*

In the drawing:
FIG. 1 is a top view of the compartmented plate;
FIG. 2 is a cross-section on line 2—2 of FIG. 1 and also shows an optional cover plate; and
FIG. 3 is a cross-section of a modified embodiment.

Plate 5 is divided by partitions 6 into four files I, II, III, IV and nine rows, A, B, C, D, E, F, G, H, I, of compartments or pools. The periphery of the plate is surrounded by wall 7 somewhat higher than partitions 6. The transverse partitions separating adjacent pools in the same file are provided with notches 8 to receive a string as described below (FIG. 2). Alternatively, the same purpose may be served by beads or pegs 9 as shown in FIG. 3.

An optional cover 10 is shown in FIG. 2 which may be laid on plate 5 for storage or incubation. Plate 5 may be made of porcelain, glass, stainless steel or other material inert to the contents of the pools. The individual compartments or pools are identified by file and row as shown in FIG. 1, e.g., A–I, F–III, etc.

In a typical test, material is distributed as follows:

A sterile nutrient media such as Mueller-Hinton agar is placed in each compartment along with the indicated drugs.

| Compartments | Drug | Concentration |
| --- | --- | --- |
| A | Controls | |
| B | Penicillin G | 2, 5, 10 and 15 units. |
| C | Tetracycline | 5, 15, 30 and 45 mcgs. |
| D | Chloramphenicol | 5, 15, 30 and 45 mcgs. |
| E | Erythromycin | 2, 5, 10 and 15 mcgs. |
| F | Oleandomycin | 2, 5, 10 and 20 mcgs. |
| G | Sodium methicillin | 2, 5, 10 and 20 mcgs. |
| H | Sulfisoxazole | 50, 100, 200, 300 mcgs. |
| I | Demethylchlortetracycline | 5, 15, 30 and 45 mcgs. |

A urine sample is obtained from the patient. A piece of sterile string is dipped into the urine until saturated. This string is then laid across compartments A–I through I–I, and is fastened at both ends. The procedure is repeated with compartments A–II through I–II, A–III through I–III and A–IV through I–IV. The plate is then covered and stored in an incubator. After incubation the sensitivity of the organism present to the various concentrations of the different drugs is determined by counting colonies in each pool.

The above is merely an example of how this invention may be put to use. The invention is not limited to the above drugs or the cited concentrations of these drugs.

From the above description it will be seen that all uncertainty arising from interpreting zones of inhibition is eliminated by my invention.

I claim:

1. A method for determining the sensitivity of pathogens in infected body fluids to the action of various drugs in varied concentrations simultaneously which comprises providing a container made of a flat plate having a plurality of adjacent isolated open top compartments, each compartment containing sterile nutrients and different known concentrations of a drug under test, saturating a narrow elongated strip of bibulous material with a sample of said infected fluid, laying said saturated strip across a plurality of said compartments and at each compartment permitting said strip to sag into said nutrient, covering and incubating the treated container, and after incubation counting the bacterial colonies in each compartment.

2. The method defined in claim 1 in which said compartments are arranged in files and rows and the bibulous strip is laid over said compartments in each file.

3. The method defined in claim 2 in which the kind of drug tested is varied from compartment to compartment along one line of adjacent compartments and the concentration of each drug is varied from compartment to compartment in a line perpendicular to said one line.

4. A kit for determining the sensitivity of pathogens in infected body fluids to the action of various drugs which apparatus comprises a flat plate provided on its upper surface with a series of adjacent compartments containing a pool of bacterial nutrient, a flat cover therefor and a plurality of elongated flexible bibulous strips, said compartments being separated by partition walls, and retaining means on walls between adjacent compartments adapted to receive and prevent inadvertent sideways displacement of said strips when laid across said compartments.

5. A kit as defined in claim 4 in which said compartments are rectangular and arranged in files and rows and in which said strip retaining means are provided on the partitions separating adjacent compartments in the same file.

6. A kit as defined in claim 4 in which said retaining means are notches.

7. A kit as defined in claim 4 in which said retaining means is selected from the group consisting of closely spaced pairs of beads and pegs.

8. A kit as defined in claim 4 in which said bibulous strips are selected from material consisting of string, filter paper strips and cloth tape.

References Cited by the Examiner

UNITED STATES PATENTS 2,397,225  3/1946  Walters _____ 292—139
2,956,931  10/1960  Goldberg _____ 195—139
3,107,204  10/1963  Brown et al. _____ 195—139

A. LOUIS MONACELL, *Primary Examiner.*

A. E. TANENHOLTZ, *Assistant Examiner.*